(12) United States Patent
Yi

(10) Patent No.: US 10,661,856 B2
(45) Date of Patent: May 26, 2020

(54) FRAME FOR BICYCLE

(71) Applicant: Giant Manufacturing Co., Ltd., Taichung (TW)

(72) Inventor: Ching-Sung Yi, Taichung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 161 days.

(21) Appl. No.: 15/942,450

(22) Filed: Mar. 31, 2018

(65) Prior Publication Data

US 2019/0248443 A1 Aug. 15, 2019

(30) Foreign Application Priority Data

Feb. 9, 2018 (TW) ............................... 107104584 A

(51) Int. Cl.
*B62K 25/28* (2006.01)

(52) U.S. Cl.
CPC ............ *B62K 25/28* (2013.01); *B62K 25/286* (2013.01)

(58) Field of Classification Search
CPC ............................... B62K 25/28; B62K 25/286
See application file for complete search history.

(56) References Cited

U.S. PATENT DOCUMENTS

| | | | | |
|---|---|---|---|---|
| 6,206,397 B1 * | 3/2001 | Klassen | ............... | B62K 25/286 280/284 |
| 7,427,077 B2 * | 9/2008 | Lesage | ................. | B62K 25/286 280/284 |
| 7,703,785 B2 * | 4/2010 | Colegrove | ............. | B62M 9/125 280/260 |
| 7,717,212 B2 * | 5/2010 | Weagle | ................ | B62K 25/286 180/227 |
| 7,793,963 B2 * | 9/2010 | Sloan | ..................... | B62K 25/28 280/152.3 |
| 7,806,422 B2 * | 10/2010 | I | ............................ | B62K 25/286 280/283 |
| 8,033,558 B2 * | 10/2011 | Earle | ..................... | B62K 25/286 280/275 |
| 9,598,140 B2 * | 3/2017 | Berthold | .................. | B62K 3/02 |
| 9,845,132 B2 * | 12/2017 | O'Connor | ............ | B62K 25/286 |
| 2005/0253357 A1 * | 11/2005 | Chang | .................. | B62K 25/286 280/283 |
| 2019/0054974 A1 * | 2/2019 | Yi | ........................ | B62K 25/286 |

FOREIGN PATENT DOCUMENTS

| | | |
|---|---|---|
| TW | 200843998 | 11/2008 |
| TW | M417317 | 12/2011 |

OTHER PUBLICATIONS

"Office Action of Taiwan Counterpart Application", dated Apr. 15, 2019, pp. 1-8.

* cited by examiner

*Primary Examiner* — Kevin Hurley
(74) *Attorney, Agent, or Firm* — JCIPRNET

(57) ABSTRACT

A frame for bicycle includes a front frame, a rear frame, a shock absorber and an upper linkage. The upper linkage is pivoted to the front frame at a first axis, pivoted to the rear frame at a second axis, and pivoted to the shock absorber at a third axis. The rear frame has a pair of chain stays and a connection part, the connection part has a pair of side portions and a bridge portion, the pair of side portions are connected to the pair of chain stays respectively, the bridge portion connects the pair of side portions, and the rear frame is pivoted to the front frame at a fourth axis through the pair of side portions or through the pair of chain stays.

15 Claims, 11 Drawing Sheets

FRAME FOR BICYCLE

CROSS-REFERENCE TO RELATED APPLICATION

This application claims the priority benefit of Taiwan application serial no. 107104584, filed on Feb. 9, 2018. The entirety of the above-mentioned patent application is hereby incorporated by reference herein and made a part of this specification.

BACKGROUND

Technical Field

The disclosure is related to a frame for bicycle.

Description of Related Art

In order to adapt to off-road traveling, the frame for bicycle may be integrated with a shock absorber to provide appropriate buffer. In the design of frame for absorbing shock, a better operation flexibility can be achieved if the distance (RC) from the axis of rear wheel to the center of the bottom bracket shell of frame is shorter, making off-road riding easier.

The shock absorbing frame is divided into two parts, namely a front triangular part and a rear triangular part. Although a corresponding design is provided between the front part and the rear part due to the difference in shock absorbing mechanism, the chain stay joint (or the chain stay) is the key component that decides the rigidity of frame. In the design of current bicycles, to increase rigidity of frame, a bridge portion is required in the configuration. However, such design makes the distance from the center of rear wheel to the center of the bottom bracket shell of frame become longer because the wheel needs to be disposed away from the bridge portion. As a result, the operation flexibility is decreased dramatically.

SUMMARY

The disclosure provides a frame for bicycle configured to enhance structural strength and improve operation flexibility.

The disclosure further includes a frame for bicycle, which includes a front frame, a rear frame, a shock absorber and an upper linkage. The upper linkage is pivoted to the front frame at a first axis, pivoted to the rear frame at a second axis, and pivoted to the shock absorber at a third axis. The rear frame has a pair of chain stays and a connection part. The connection part has a pair of side portions and a bridge portion. The pair of side portions are connected to the pair of chain stays respectively. The bridge portion connects the pair of side portions, and the rear frame is pivoted to the front frame at a fourth axis through the connection part or through the pair of chain stays.

In an embodiment of the disclosure, the bridge portion connects the pair of side portions through the lower edge of the pair of side portions.

In an embodiment of the disclosure, the bridge portion connects the pair of side portions through portions of the pair of side portions under a horizon passing through the fourth axis.

In an embodiment of the disclosure, the connection part has a pair of pivoting portions, and each of the side portions is extended forward and forms a corresponding pivoting portion.

In an embodiment of the disclosure, each of the side portions is extended backward and connected to the corresponding chain stay.

In an embodiment of the disclosure, the pair of side portions are extended backward relative to the bridge portion in different lengths.

In an embodiment of the disclosure, the connection part has a recess facing backward, and the recess receives the rear wheel of the bicycle with at least half or more of the depth of the recess.

In an embodiment of the disclosure, the pair of side portions and the bridge portion construct the recess.

In an embodiment of the disclosure, a first half section of the orthogonal projection of a portion of one of the pair of side portions extended backward from the bridge portion on a geometric plane perpendicular to the fourth axis overlaps the orthogonal projection of the rear wheel of the bicycle on the geometric plane.

In an embodiment of the disclosure, at least half of a connection line between the orthogonal projections of a rear edge of the side portions and a rear edge of the bridge portion on a geometric plane overlaps the orthogonal projection of the rear wheel on the geometric plane.

In an embodiment of the disclosure, each of the chain stays has a front portion and a rear portion, and the pair of front portions and the pair of rear portions are pivoted to a fifth axis.

In an embodiment of the disclosure, the rear frame is pivoted to the front frame at the fourth axis through the pair of side portions.

In an embodiment of the disclosure, each of the chain stays has a lower link, and the lower links are pivoted to the front frame at the fourth axis and pivoted to the connection part at a fifth axis.

In an embodiment of the disclosure, the connection part has a pair of pivoting portions, each of the side portions is extended forward and forms the corresponding pivoting portion, and the pair of pivoting portions are pivoted to the lower links at the fifth axis.

In an embodiment of the disclosure, the bridge portion connects the pair of side portions through portions of the pair of side portions under a horizon passing through the fifth axis.

In an embodiment of the disclosure, a first half section of an orthogonal projection of a portion of one of the pair of side portions extended backward from the bridge portion on a geometric plane perpendicular to the fifth axis overlaps an orthogonal projection of a rear wheel of bicycle on the geometric plane.

Based on the above, in the disclosure, the bridge portion of the connection part connects the pair of side portions to enhance structural strength of the rear frame.

In order to make the aforementioned features and advantages of the disclosure more comprehensible, embodiments accompanying figures are described in detail below.

DESCRIPTION OF EMBODIMENTS

Figure 1:
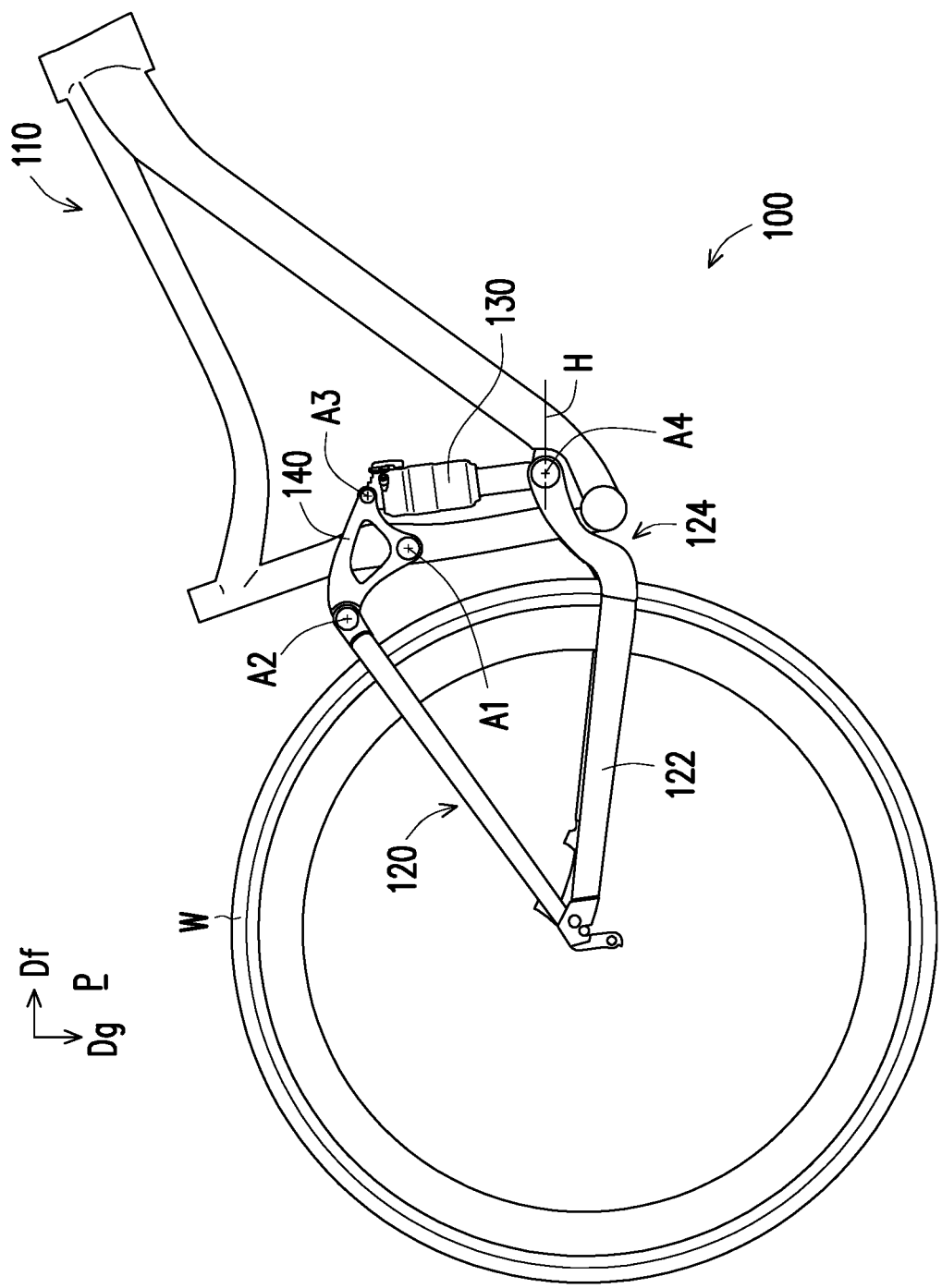
FIG. 1 is a schematic view illustrating a frame and a rear wheel of a bicycle according to an embodiment of the disclosure.

Referring to FIG. 1, in the embodiment, a frame 100 for bicycle includes a front frame 110, a rear frame 120, a shock absorber 130 and an upper linkage 140. The upper linkage 140 is pivoted to the front frame 110 at a first axis A1, pivoted to the rear frame 120 at a second axis A2, and pivoted to the shock absorber 130 at a third axis A3. The rear frame has a pair of chain stays 122 and a connection part 124. In the embodiment, the pair of chain stays 122 may be a metal tube, and the connection part 124 may be a forging part.

Figure 2A:
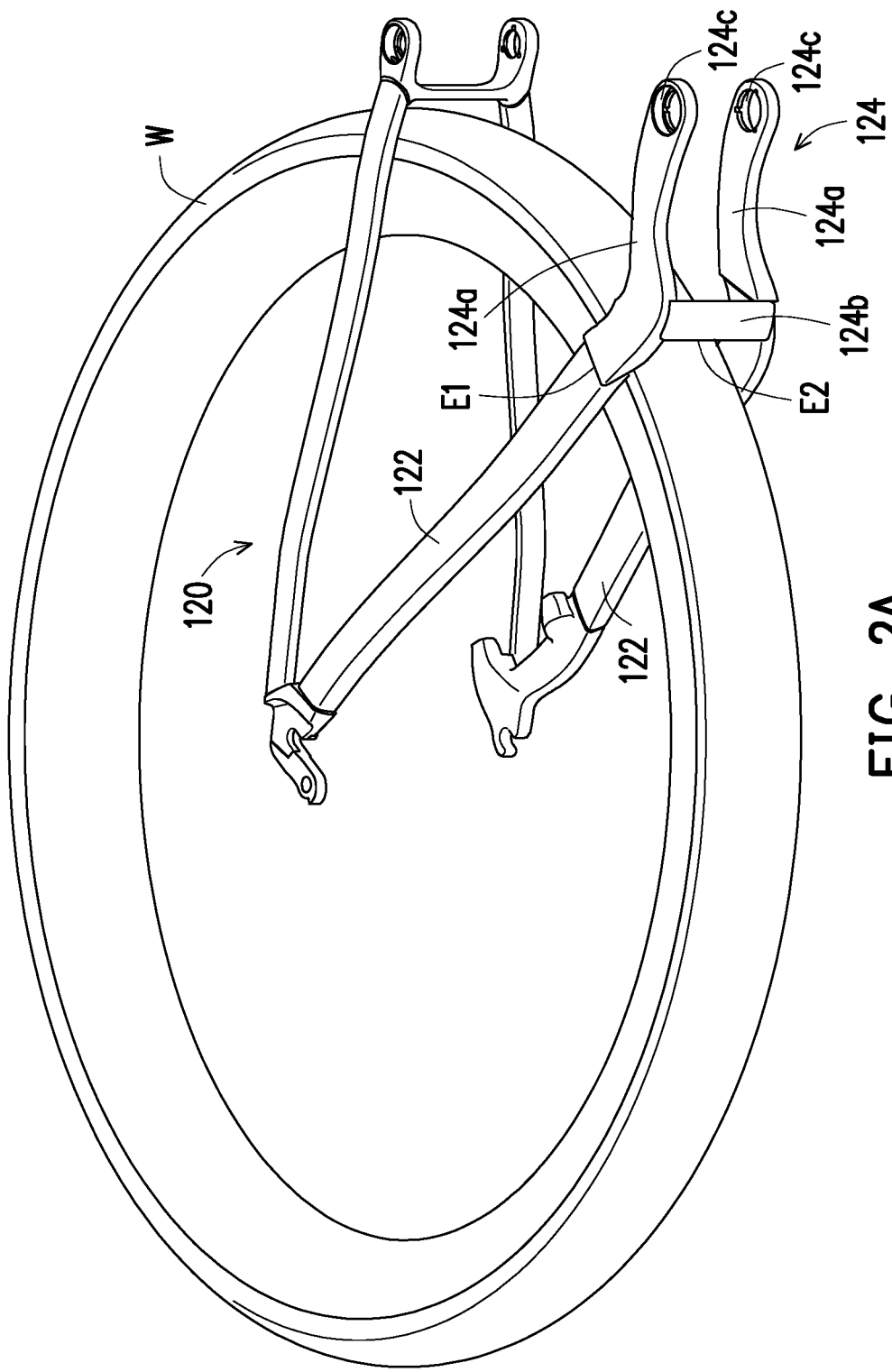
FIG. 2A is a perspective view illustrating a rear frame and a rear wheel of a frame according to yet another embodiment of the disclosure.
Figure 2B:
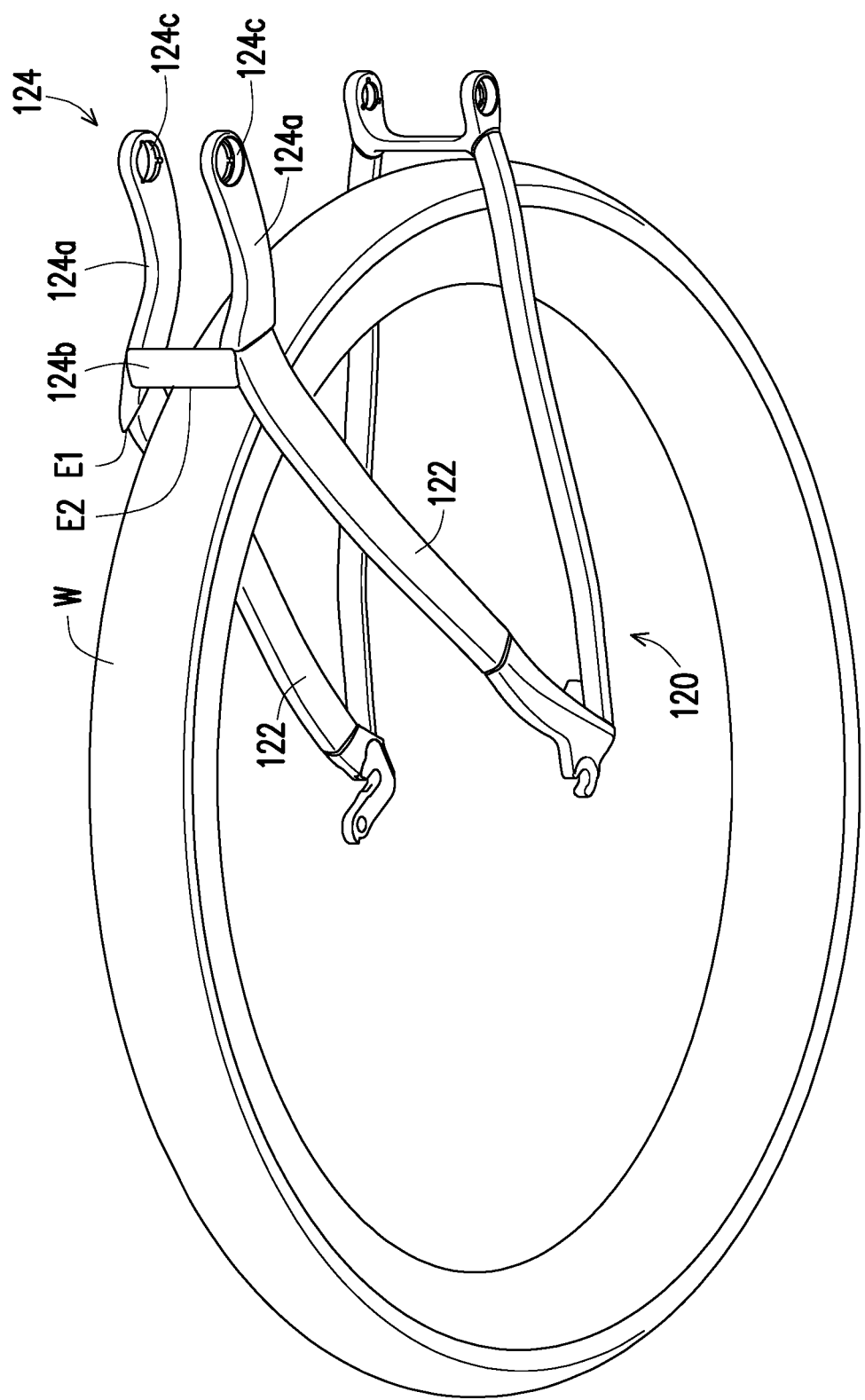
FIG. 2B is a perspective view illustrating the rear frame and the rear wheel of the frame in FIG. 2A at another viewing angle.
Figure 3:
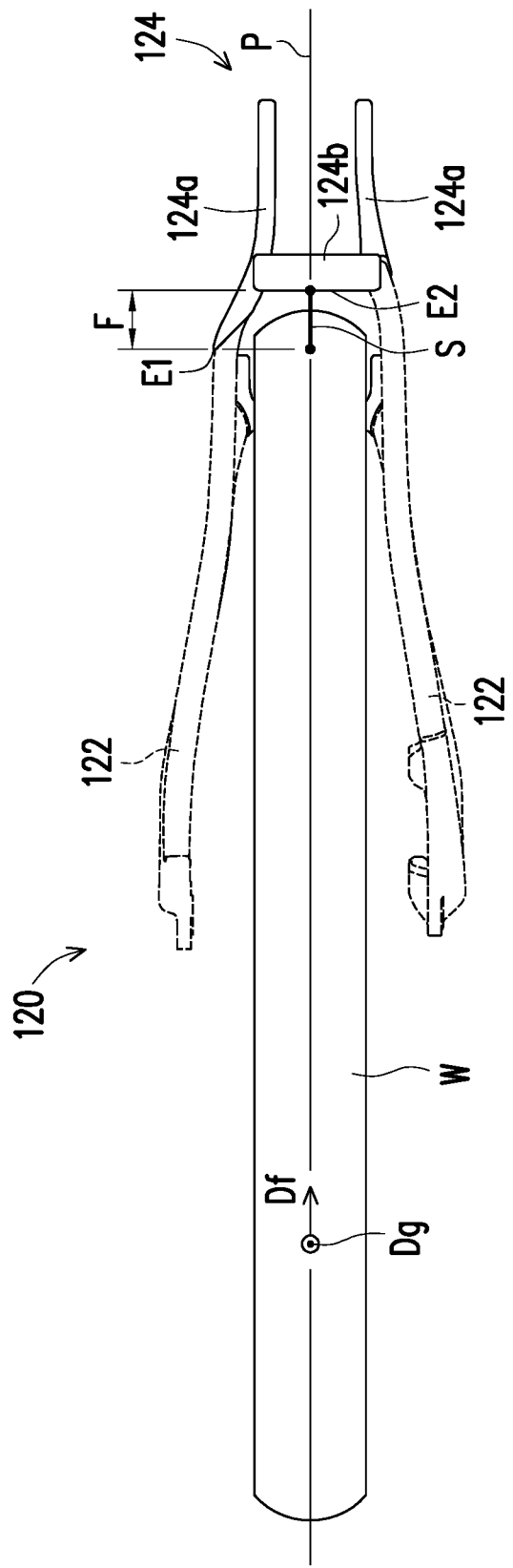
FIG. 3 is a bottom view illustrating the rear frame and the rear wheel of the frame in FIG. 2A.

Referring to FIG. 2A, FIG. 2B and FIG. 3, the connection part 124 has a pair of side portions 124a and a bridge portion 124b. The pair of side portions 124a are connected to the pair of chain stays 122 respectively, and the bridge portion 124 connects the pair of side portions 124a. The rear frame 120 is pivoted to the front frame 110 at a fourth axis A4 through the connection part 124. In the embodiment, each of the side portions 124a is extended backward and connected to (e.g., welded to) the corresponding chain stay 122, and the rear frame 120 is pivoted to the front frame 110 at the fourth axis A4 through the pair of side portions 124a. In the embodiment, the bridge portion 124b may connect the lower edges of the pair of side portions 124a through the lower edges of the pair of side portions 124a. Alternatively, the bridge portion 124b connects the pair of side portions 124a through portions of the pair of side portions 124a under a horizon H (shown in FIG. 1) passing through the fourth axis A4. Additionally, the connection part 124 has a pair of pivoting portions 124c (e.g., a pair of pivoting holes), and each of the side portions 124a is extended forward and forms the corresponding pivoting portion 124c.

Referring to FIG. 2A, FIG. 2B and FIG. 3, the pair of side portions 124a are extended backward relative to the bridge portion 124b in different lengths. In other embodiments that are not shown, the pair of side portions 124a may be extended backward relative to the bridge portion 124b in the same length.

Referring to FIG. 1 and FIG. 3, a first half section of the orthogonal projection of a portion of one of the pair of side portions 124a extended backward from the bridge portion 124b on a geometric plane P perpendicular to the fourth axis A4 may overlap the orthogonal projection of the rear wheel W of the bicycle on the geometric plane P. In the embodiment, the first half section of the orthogonal projection of a portion of one of the pair of side portion 124a which is extended backward longer (the side portion 124a in the upper part of FIG. 3) and extended backward from the bridge portion 124b on the geometric plane P perpendicular to the fourth axis A4 may overlap the orthogonal projection of the rear wheel W of bicycle on the geometric plane P. Additionally, the first half section of the orthogonal projection of a portion of one of the pair of side portions 124a which is extended backward shorter (the side portion 124a in the lower part of FIG. 3) and extended backward from the bridge portion 124b on the geometric plane P perpendicular to the fourth axis A4 also overlaps the orthogonal projection of the rear wheel W of bicycle on the geometric plane P. The geometric plane P may be a geometric plane P constructed by a forwarding direction Df and a gravity direction Dg, wherein the forwarding direction Df refers to a direction along which the bicycle using the frame 100 moves forward, and the gravity direction Dg refers to the direction along which the bicycle using the frame 100 is subjected to the gravity.

Figure 4:
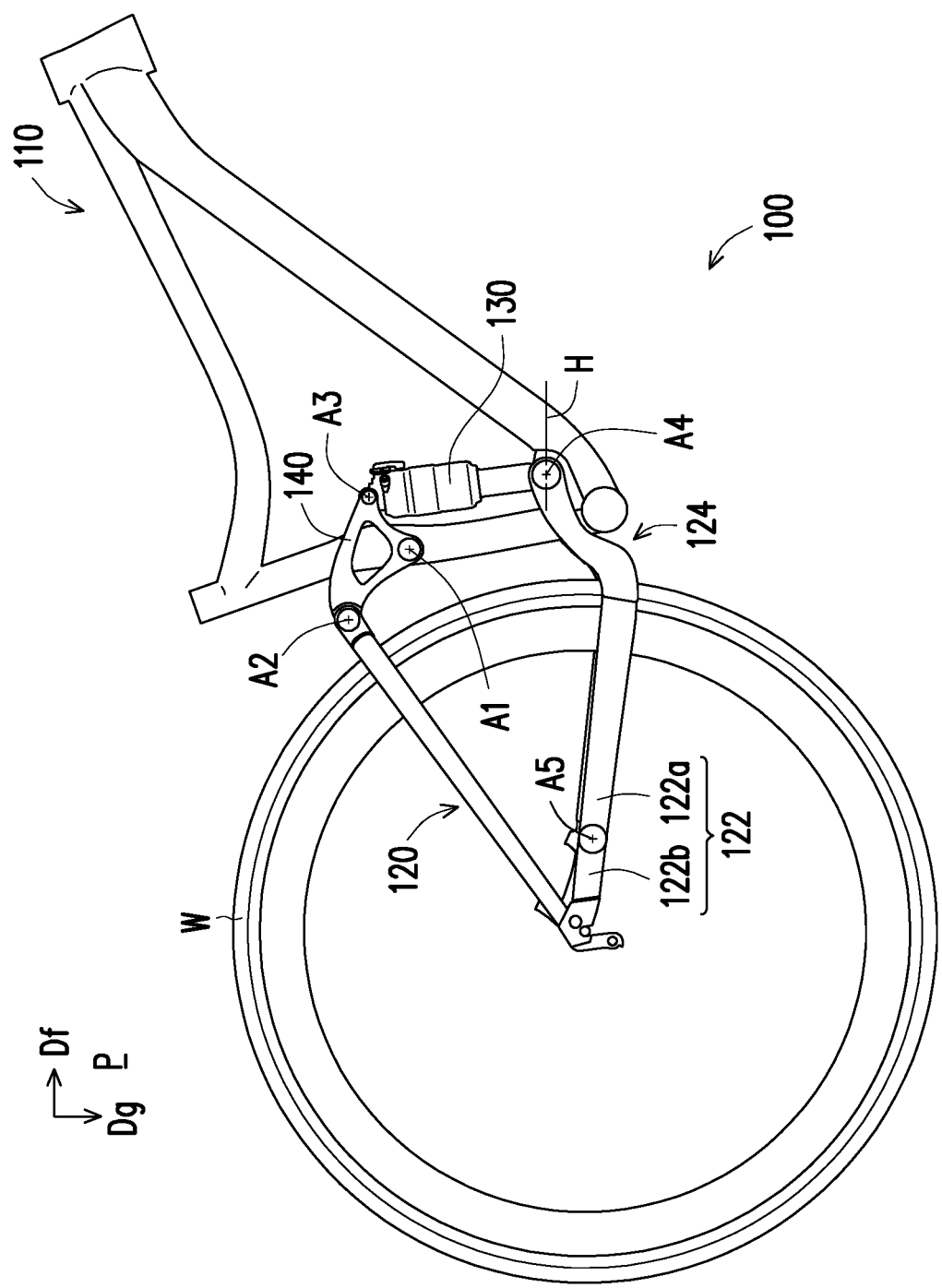
FIG. 4 is a schematic view illustrating a frame and a rear wheel of a bicycle according to still another embodiment of the disclosure.

Another embodiment shown in FIG. 4 is similar to the embodiment shown in FIG. 1. As compared with the embodiment shown in FIG. 1, in the embodiment shown in FIG. 4, each of the chain stays 122 further includes a front portion 122a and a rear portion 122b, and the pair of front portions 122a and the pair of rear portions 122b are pivoted together at a fifth axis A5.

Figure 5:
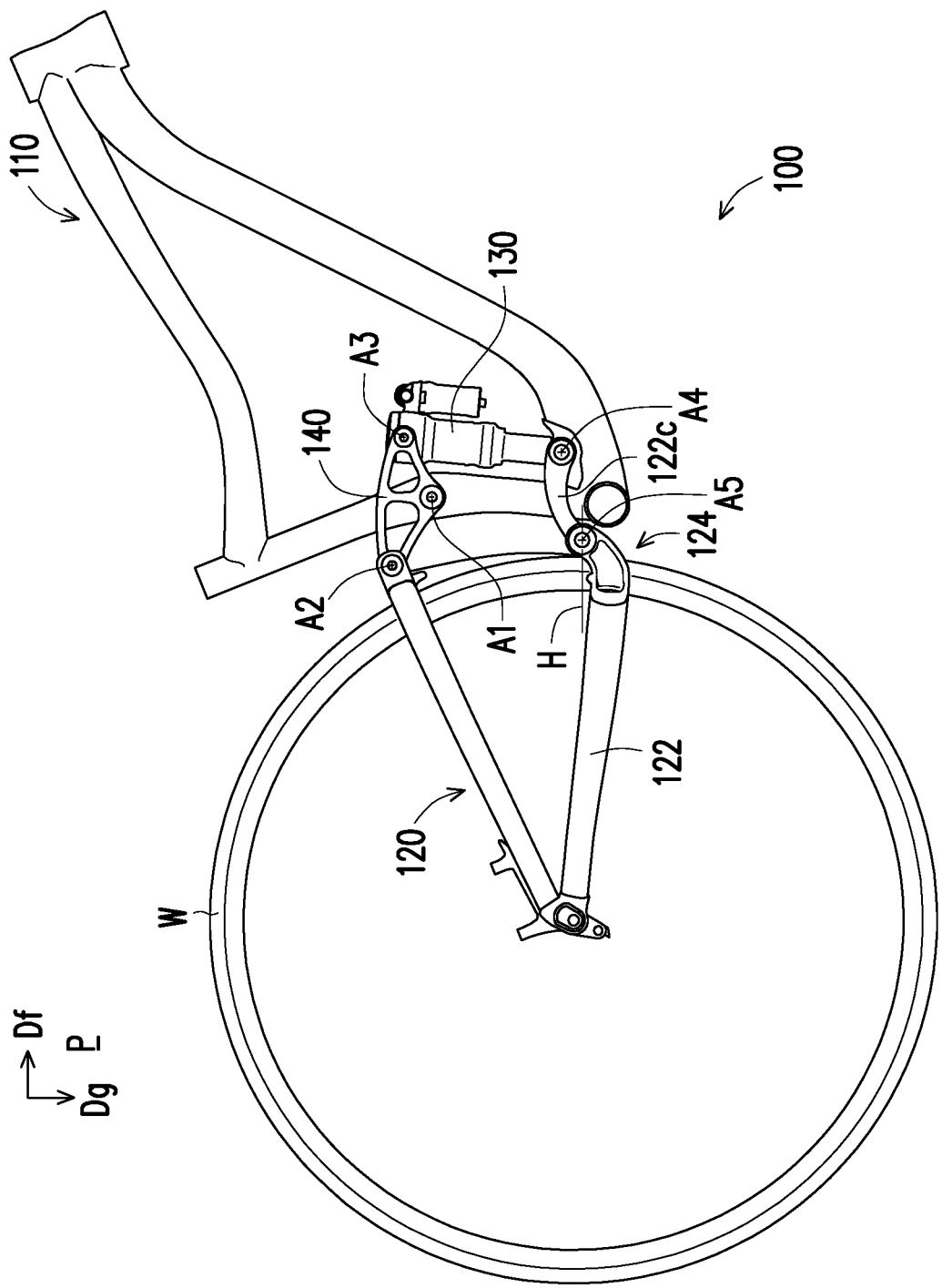
FIG. 5 is a schematic view illustrating a frame and a rear wheel of a bicycle according to another embodiment of the disclosure.
Figure 6:
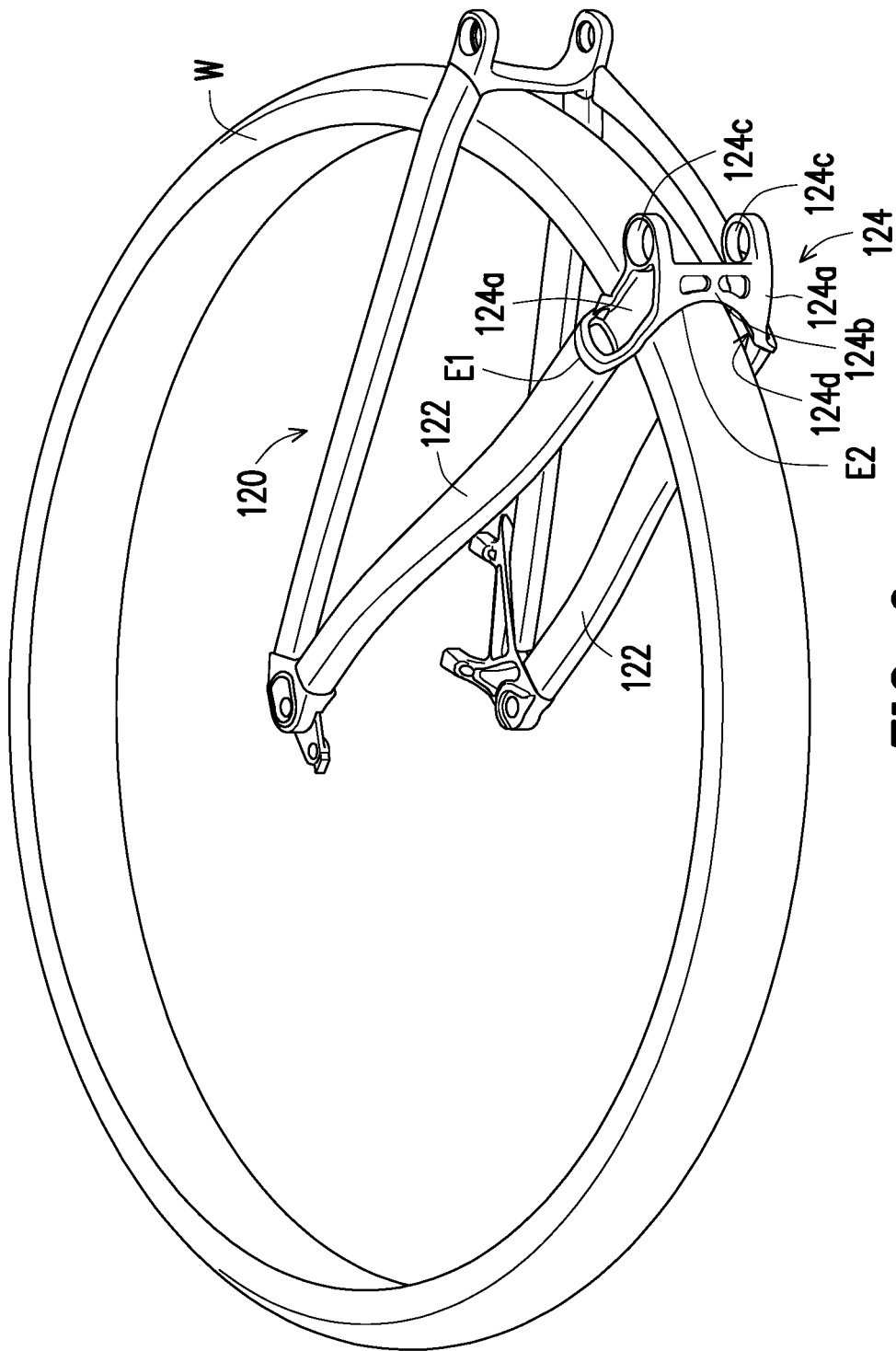
FIG. 6 is a perspective view illustrating a rear frame and a rear wheel of the frame in FIG. 5.
Figure 7:
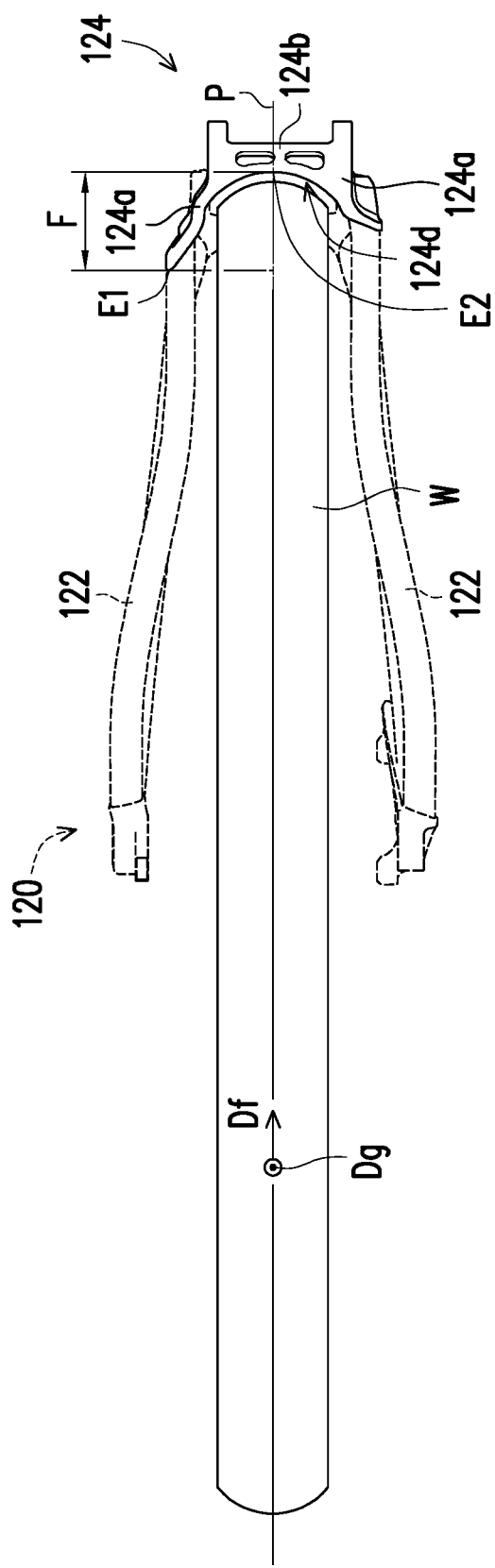
FIG. 7 is a bottom view illustrating the rear frame and the rear wheel of the frame in FIG. 6.

Another embodiment illustrated in FIG. 5, FIG. 6 and FIG. 7 is similar to the embodiment shown in FIG. 1, FIG. 2A, FIG. 2B and FIG. 3. As compared with the embodiment shown in FIG. 1, FIG. 2A, FIG. 2B and FIG. 3, in the yet another embodiment illustrated in FIG. 5, FIG. 6 and FIG. 7, each of the chain stays 122 further has a lower link 122c, and the lower links 122c are pivoted to the front frame 110 at the fourth axis A 4 and pivoted to the connection part 124 at a fifth axis A5. The connection part 124 has a pair of pivoting portions 124c, each of the side portions 124a is extended forward and forms the corresponding pivoting portion 124a, and the pair of pivoting portions 124c are pivoted to the lower links 122c at the fifth axis A5. The bridge portion 124b connects the pair of side portions 124a through portions of the pair of side portions 124a under a horizon H passing through the fifth axis A5. A first half section of an orthogonal projection of a portion of one of the pair of side portions 124a extended backward from the bridge portion 124b on a geometric plane P perpendicular to the fifth axis A5 overlaps an orthogonal projection of a rear wheel W of bicycle on the geometric plane P.

Referring to FIG. 6 and FIG. 7, the connection part 124 has a recess 124d facing backward, and the recess 124d receives a rear wheel W of the bicycle with at least half or more of a depth F of the recess 124d. In the embodiment, the pair of side portions 124a and the bridge portion 124b may construct the recess 124d. When the pair of side portions 124a are extended backward in different lengths, the depth F of the recess 124d refers a maximum distance between the orthogonal projections of a rear edge E1 of the side portion 124a that is extended backward longer and a rear edge E2 of the bridge portion 124b on a geometric plane P. In other words, at least half or more of the connection line S between the orthogonal projections of the rear edge E1 of the side portion 124a extended backward longer and the rear edge E2 of the bridge portion 124b on the geometric plane P overlaps the orthogonal projection of the rear wheel W on the geometric plane P.

Figure 8A:
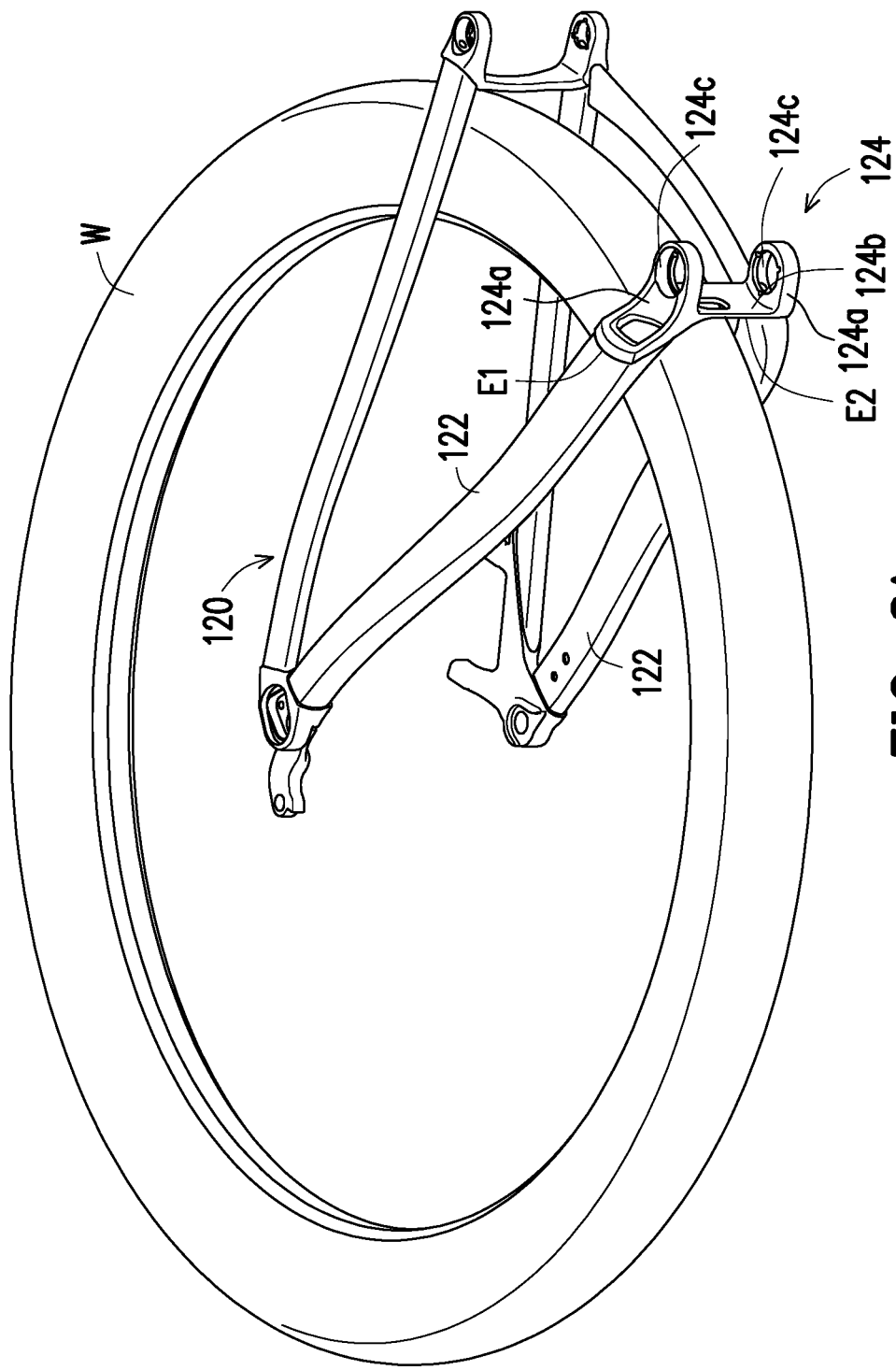
FIG. 8A is a perspective view illustrating a rear frame and a rear wheel of a frame according to another embodiment of the disclosure.
Figure 8B:
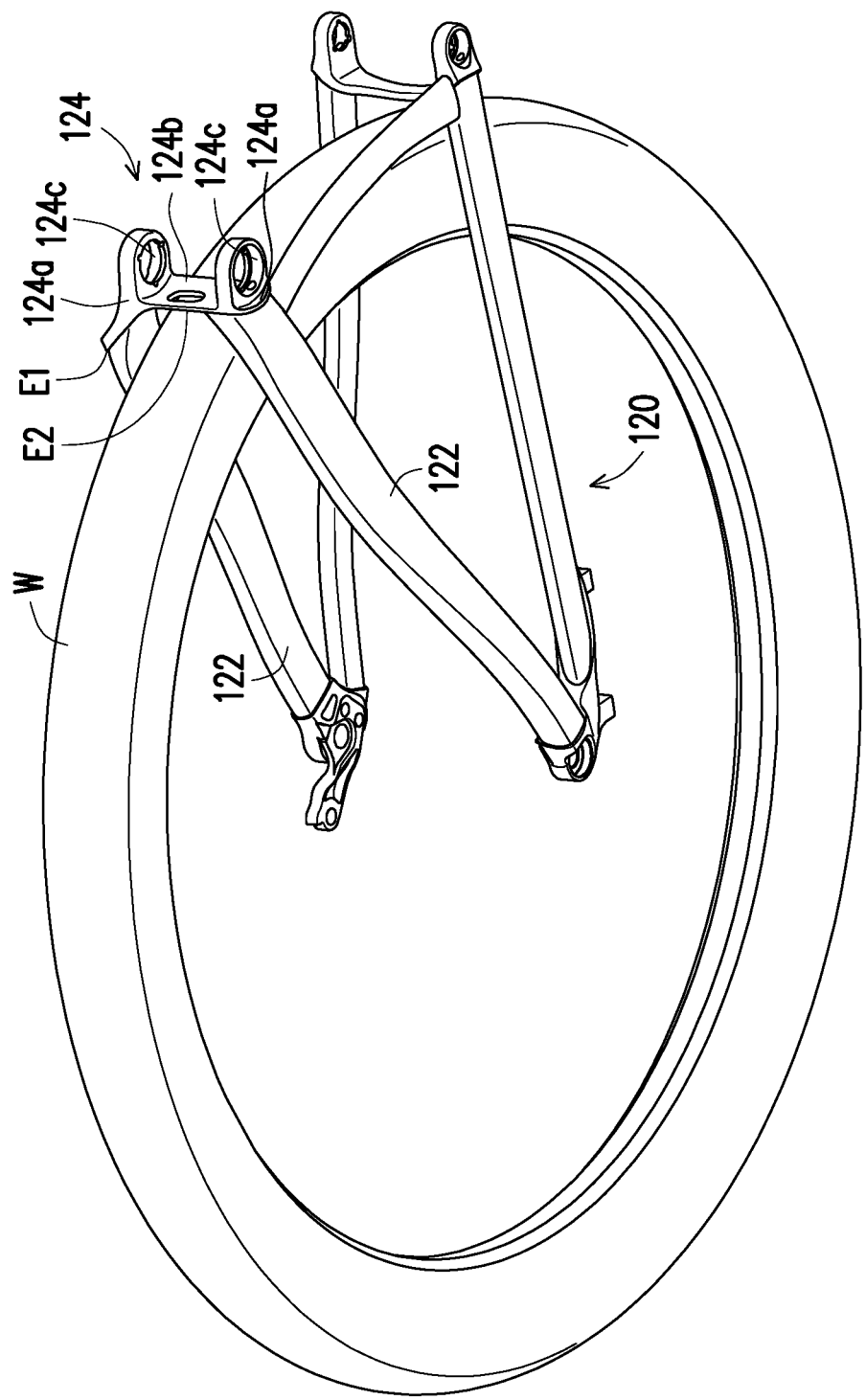
FIG. 8B is a perspective view illustrating the rear frame and the rear wheel of the frame in FIG. 8A at another viewing angle.
Figure 9:
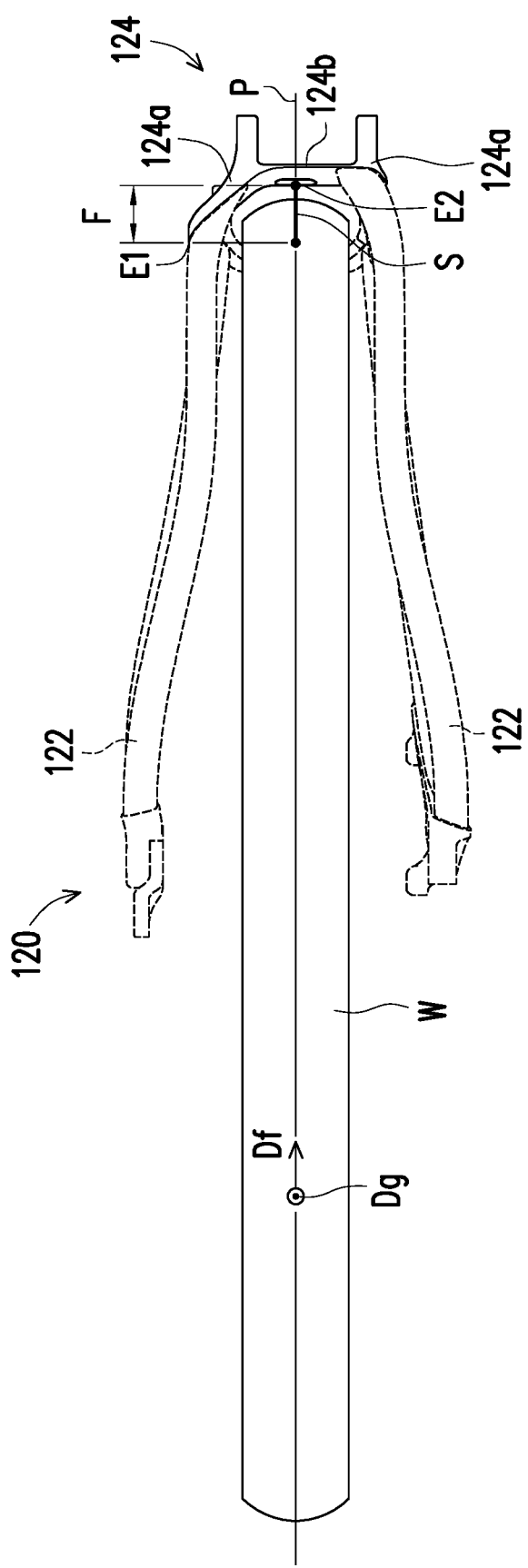
FIG. 9 is a bottom view illustrating the rear frame and the rear wheel of the frame in FIG. 4A.

Another embodiment illustrated in FIG. 8A, FIG. 8B and FIG. 9 is similar to the embodiment illustrated in FIG. 5, FIG. 6 and FIG. 7. In the embodiment shown in FIG. 5, FIG. 6 and FIG. 7, the pair of side portions 124a are both extended backward beyond the bridge portion 124b. However, in the embodiment shown in FIG. 8A, FIG. 8B and FIG. 9, only one of the pair of side portions 124a is extended backward beyond the bridge portion 124b. At least half of a connection line S between the orthogonal projections of the rear edge E1 of the side portion 124a which is extended backward beyond the bridge portion 124b and the rear edge E2 of the bridge portion 124b on the geometric plane P overlaps the orthogonal projection of the rear wheel W on the geometric plane P.

As compared with the embodiment shown in FIG. 1 and FIG. 3, in the embodiment shown in FIG. 6 and FIG. 8, the first half section of the orthogonal projection of a portion of one of the pair of side portions 124a extended backward from the bridge portion 124b on a geometric plane P perpendicular to the fourth axis A4 may overlap the orthogonal projection of the rear wheel W of bicycle on the geometric plane P.

In summary, according to the disclosure, the bridge portion of the connection part connects the pair of side portions to enhance structural strength of the rear frame. Additionally, the recess of the connection part allows the rear wheel to move in to reduce the length of chain stay, such that the structural strength can be improved and the operation flexibility can be enhanced.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A frame for bicycle, comprising:
a front frame;
a rear frame;
a shock absorber;
an upper linkage, pivoted to the front frame at a first axis, pivoted to the rear frame at a second axis, and pivoted to the shock absorber at a third axis; and
wherein the rear frame has a pair of chain stays and a connection part, the connection part has a pair of side portions and a bridge portion, the pair of side portions are connected to the pair of chain stays respectively, the bridge portion connects the pair of side portions, and the rear frame is pivoted to the front frame at a fourth axis through the connection part or through the pair of chain stays,
wherein the bridge portion connects the pair of side portions through a lower edge of the pair of side portions.

2. The frame according to claim 1, wherein the bridge portion further connects the pair of side portions through portions of the pair of side portions under a horizon passing through the fourth axis.

3. The frame according to claim 1, wherein the connection part has a pair of pivoting portions, and each of the side portions is extended forward and forms the corresponding pivoting portion.

4. The frame according to claim 1, wherein each of the side portions is extended backward and connected to the corresponding chain stay.

5. The frame according to claim 1, wherein the pair of side portions are extended backward relative to the bridge portion in different lengths.

6. The frame according to claim 1, wherein a first half section of an orthogonal projection of a portion of one of the pair of side portions extended backward from the bridge portion on a geometric plane perpendicular to the fourth axis overlaps an orthogonal projection of a rear wheel of bicycle on the geometric plane.

7. The frame according to claim 1, wherein each of the chain stays has a front portion and a rear portion, and the pair of front portions and the pair of rear portions are pivoted together at a fifth axis.

8. The frame according to claim 1, wherein the rear frame is pivoted to the front frame at the fourth axis through the pair of side portions.

9. A frame for bicycle, comprising:
a front frame;
a rear frame;
a shock absorber;
an upper linkage, pivoted to the front frame at a first axis, pivoted to the rear frame at a second axis, and pivoted to the shock absorber at a third axis; and
wherein the rear frame has a pair of chain stays and a connection part, the connection part has a pair of side portions and a bridge portion, the pair of side portions are connected to the pair of chain stays respectively, the bridge portion connects the pair of side portions, and the rear frame is pivoted to the front frame at a fourth axis through the connection part or through the pair of chain stays,
wherein the connection part has a recess facing backward, and the recess receives a rear wheel of bicycle with at least half or more of a depth of the recess.

10. The frame according to claim 9, wherein the pair of side portions and the bridge portion construct the recess.

11. The frame according to claim 9, wherein at least half of a connection line between orthogonal projections of a rear edge of the side portion and a rear edge of the bridge portion on a geometric plane overlaps an orthogonal projection of a rear wheel of bicycle on the geometric plane.

12. A frame for bicycle, comprising:
a front frame;
a rear frame;
a shock absorber;
an upper linkage, pivoted to the front frame at a first axis, pivoted to the rear frame at a second axis, and pivoted to the shock absorber at a third axis; and
wherein the rear frame has a pair of chain stays and a connection part, the connection part has a pair of side portions and a bridge portion, the pair of side portions are connected to the pair of chain stays respectively, the bridge portion connects the pair of side portions, and the rear frame is pivoted to the front frame at a fourth axis through the connection part or through the pair of chain stays,
wherein each of the chain stays has a lower link, and the lower links are pivoted to the front frame at the fourth axis and pivoted to the connection part at a fifth axis.

13. The frame according to claim 12, wherein the connection part has a pair of pivoting portions, each of the side portions is extended forward and forms the corresponding pivoting portion, and the pair of pivoting portions are pivoted to the lower links at the fifth axis.

14. The frame according to claim 12, wherein the bridge portion connects the pair of side portions through portions of the pair of side portions under a horizon passing through the fifth axis.

15. The frame according to claim 12, wherein a first half section of an orthogonal projection of a portion of one of the pair of side portions extended backward from the bridge portion on a geometric plane perpendicular to the fifth axis overlaps an orthogonal projection of a rear wheel of bicycle on the geometric plane.

* * * * *